(12) United States Patent
Ernst et al.

(10) Patent No.: US 6,947,868 B2
(45) Date of Patent: Sep. 20, 2005

(54) METHOD FOR ANALYSIS OF THE TIME RESPONSE OF COMPLEX DISTRIBUTED SYSTEMS

(75) Inventors: Rolf Ernst, Braunschweig (DE); Kai Richter, Braunschweig (DE)

(73) Assignee: Technische Universitat Braunschweig Carlo-Wilhelmina Institut fur Datentechnik und Kommunikationsnetze, Braunschweig (DE)

(*) Notice: Subject to any disclaimer, the term of this patent is extended or adjusted under 35 U.S.C. 154(b) by 0 days.

(21) Appl. No.: 10/305,421

(22) Filed: Nov. 27, 2002

(65) Prior Publication Data

US 2003/0120450 A1 Jun. 26, 2003

(30) Foreign Application Priority Data

Nov. 30, 2001 (DE) .................................. 101 58 853

(51) Int. Cl.⁷ .............................................. G06F 15/00
(52) U.S. Cl. .................... 702/176; 702/181; 703/17; 703/19
(58) Field of Search .................... 702/119, 122–123, 702/176–179, 181–188; 703/7–8, 14, 17, 19; 714/55, 735

(56) References Cited

U.S. PATENT DOCUMENTS

| | | | | |
|---|---|---|---|---|
| 5,881,268 A | * | 3/1999 | McDonald et al. | 703/21 |
| 6,141,630 A | * | 10/2000 | McNamara et al. | 703/14 |
| 6,311,144 B1 | * | 10/2001 | Abu El Ata | 703/2 |
| 6,321,187 B1 | * | 11/2001 | Squier et al. | 703/18 |
| 6,415,244 B1 | * | 7/2002 | Dickens et al. | 702/187 |
| 6,574,665 B1 | * | 6/2003 | Khotimsky | 709/224 |
| 6,701,363 B1 | * | 3/2004 | Chiu et al. | 709/224 |
| 6,704,697 B1 | * | 3/2004 | Berevoescu et al. | 703/19 |
| 6,728,658 B1 | * | 4/2004 | Bechhoefer | 702/181 |

OTHER PUBLICATIONS

Hellerstein et al., "ETE: A Customizable Approach to Measuring End–to–End Response Times and Their Components in Distributed Systems", May 31–Jun. 4, 1999, Distributed Computing Systems, 1999. Proceedings. 19th IEEE International Conference on, p. 152–162.*

Bus Access Optimization for Distributed Embedded Systems Based on Schedulability Analysis, Paul Pop, Petru Eles, Zebo Peng, Dept. Of Computer and Information Science, Linkoping University, Sweden.

An Extendible Approach for Analysing Fixed Prioprity Hard Real–Time Tasks, K. W. Tindell, Dept. Of Computer Science, University of York, England YOI 5DD pp. 1–16.

TTP–A Protocol for Fault–Tolerant Real–Time Systems, Hermann Kopetz, Technical University of Vienna Gunter Grunsteidl, Alcatel Austria Research Center.

Scheduling Algoithms for Multiprogramming in a Hard–Real–Time Environment, C. L. Liu, Project MAC, Massachusetts Institute of Technology, James W. Layland Jet Propulsion Laboratory, California Institute of Technology.

* cited by examiner

*Primary Examiner*—Marc S. Hoff
*Assistant Examiner*—Mary Catherien Baran
(74) *Attorney, Agent, or Firm*—Whitham, Curtis & Christofferson, P.C.

(57) ABSTRACT

Complex distributed systems with basic components (B) which have data processing program modules and/or electronic circuit modules that exchange data with each other have their timing behavior analyzed based on the timing behavior of individual basic components (B) and transformation functions derived from event model classes.

6 Claims, 6 Drawing Sheets

METHOD FOR ANALYSIS OF THE TIME RESPONSE OF COMPLEX DISTRIBUTED SYSTEMS

FIELD OF THE INVENTION

The invention relates to a method for analysis of the time response of complex distributed systems having basic components which have data processing program modules and/or electronic circuit modules.

BACKGROUND OF THE INVENTION

When designing complex distributed digital systems, a large number of components in the form of data processing program modules and/or electronic circuit modules are combined with one another, and may each have a different origin. The components of different development teams can thus be designed, or may be reused components as well as standard components. Such complex digital systems may be time-critical since not only one functional function capability, that is to say the calculation of correct values, but also compliance with given time boundary conditions must be guaranteed for the output of the calculated values. For example, maximum permissible latences (delays or propagation times) or reaction times, for example for initiating the airbag in a car, or a minimum guaranteed data throughput rate per unit time, for example for video processing with fixed frame repetition frequencies, must be ensured. Boundary conditions such as these must be taken into account in the design of the complex distributed digital systems.

The components which are used in a design are generally developed using widely differing methods and tools, which are chosen by the developers as a function of the primary design features as well as the feasible specification languages, specification models and design tools. A conventional design of a distributed digital system is thus inherently heterogeneous in terms of its components.

The individual program and circuit modules are used to implement processes, which may compete with other processes for a resource, for example a processor. This results in a high level of mutual coupling with respect to the time response of the system, so that a basic component having data processing program modules and/or electronic circuit modules must be regarded as an entity, taking into account the process, the scheduling strategy and the processor.

It is known for the processes to be investigated by means of process analysis relating to the latencies or delay times of individual processes. In this case, it is assumed that the resources are available exclusively to the process under consideration at that time. In order to make it possible to guarantee compliance with the time boundary conditions in real-time systems in all circumstances, the analysis is based on the identification of critical situations (worst case).

In addition, the communication response of the individual process can be evaluated by means of a local analysis. The local analysis is dependent on the tools which have been used to design a basic component. It is also governed by the time response of the basic components.

Global analysis is used to determine the time response of the overall system. In this case, causal relationships between individual local basic components are identified, providing a conclusion about the internal functional sequences in the overall system. These relationships may be extracted from the knowledge about the communication response of the individual processes. However, internal sequences are restricted not only to simple event and sequence chains, but often include the splitting and synchronization of the abstract system functions into parallel processes. The overall time response can thus not be formed by simple accumulation of the execution times for the individual processes.

The time response of the overall system is also influenced by the shared use of resources. If, for example, a number of processes are intended to be executed on one processor, the access by the processes to the processor must be controlled, since only one process can ever be processed at one time. This access control or sequence planning is referred to as scheduling and is an integral part of a basic component. Furthermore, the access to jointly used communications media, such as data buses, is controlled by arbitration mechanisms in distributed systems. The influences from the scheduling and the arbitration on the time response can be recorded only by means of complex mathematical time models.

A method for local analysis of systems with statistical priority assignments and which is restricted to strictly periodic process activations is described in C. L. Liu, J. W. Layland: Scheduling Algorithms for Multiprogramming in a Hard-Real-Time Environment in Journal of the Association for Computing Machinery, Vol. 20, No. 1, January 1973, pages 46–61. Each process has a time period which indicates the separation between two activations. The processes are regarded as being functionally independent, that is to say the processes do not communicate with one another and do not call one another. The method is based on calculation of the upper bounds (worst-case bounds) for the response times of processes. The response time of a process is in this case measured between the process call and the process end and, in addition to the core execution time which is governed by local analysis, also includes the interruptions by higher priority processes. The response time of a process is in this case the sum of the core execution time for the process and of the overall delay resulting from interruptions by other processes. The maximum response time and, in a corresponding manner, the minimum response time, can be determined mathematically by iterative solution of an appropriate equation system.

This analysis method has been extended in many ways in order to obtain guaranteed limits for other activation schemes as well. For example, K. W. Tindell: An Extendible Approach For Analyzing Fixed Priority Hard Real-Time Tasks, in: Journal of Real-Time Systems 6 (2), March 1994, pages 133 to 152 describes a local analysis method for processes with periodic activation with jitter, that is to say with a maximum permissible delay in the activation with respect to a fixed period, as well as for bundle activation with buffering.

Similar analyses for another scheduling strategy (time slice method) are described in K. Kopetz, G. Grünsteidl: TTP—A Protocol for Fault-Tolerance Real-time Systems: IEEE Trans. Computers, January 1994, pages 14 to 23, in which complex distributed systems are dealt with by means of a time-triggered protocol. The method is based on periodic event streams. The communication bandwidth is recorded statistically, and jitter nodes are analyzed in the time domain.

The activations of the processes in the basic components are based on data or events which are interchanged between the individual basic components. The event streams are represented as abstract event models, depending on the characteristic. The simplest abstract event model represents periodically recurring events by means of a single parameter, the period T (periodic). A somewhat more complex event model relates to the assumption that the events are generally cyclic, but with a varying restricted offset being permissible with respect to an exactly periodic event (jitter) Events which occur in groups are recorded using the so-called burst event model. The event model for sporadic events determines a minimum time interval between two successive events (sporadic).

These four event models which have been mentioned—cyclic, jitter, burst, sporadic—represent the most important event models. In a corresponding way, scheduling methods are known with statistical priorities, dynamic priority assignments as a function of maximum permissible response times, cyclic timeslot methods, in which the processor is available exclusively to each process for a certain time, etc, and analysis models exist for describing the time response (time models).

One problem that arises in the global analysis of complex distributed systems is that the local analysis methods are restricted to the individual basic components and predetermine the nature of the event models. Systems with different types of event models thus generally cannot be analyzed using a single analysis method.

Pai H. Chou, Gaetano Boriello: Synthesis and Optimization of Coordination Controllers for Distributed Embedded Systems, in: Proc. Design Automation Conference (DAC), 2000, Los Angeles, pages 410 et seq provides a standard description of an overall system for carrying out a global analysis, which is based on process states. Critical cases relating to the overall system, which is obtained from the cross-product of the individual process states, must be identified for analysis. With complex systems, this has the disadvantage that it leads to a state space explosion with the consequence that overall analysis is virtually impossible.

SUMMARY OF THE INVENTION

The object of the invention is thus to provide an improved, efficient method for analysis of the time response of complex distributed systems, by means of which a complex distributed system is made possible globally with regard to the time response and taking account of different types of event models and different local analysis methods for the individual basic components.

Using the method of this generic type, the object is achieved according to the invention by the following steps:

a) Determination of the input event models for recording input event streams at the input of the respective basic components in the distributed system;

b) Determination of transformation functions for matching the representation of input event streams at the input of one basic component in an input event model which is suitable for that basic component;

c) Local analysis of the basic components using the associated input event models in order to determine the time responses of the individual basic components;

d) Determination of the time response of the complex distributed system from the determined time responses of the individual basic components.

The matching of the representation of the input event streams for the basic components which can be analyzed and are associated with suitable input event models now makes it possible to carry out a local analysis using the available analysis methods. The determined time response for the basic components is in this case also applicable throughout the entire distributed system, since only one transformation of the event models or event streams has been carried out, so that one time model is produced for the entire distributed system. In other words, basic components are coupled in the design such that the coupling includes a mathematical correspondence, which can thus be analyzed. It is thus also possible to couple the existing analysis methods to a global analysis, for the first time.

Two successive processes with different event models for the output event stream at the output of the preceding basic component and for the input event stream at the input of the downstream basic component are thus matched to one another by means of the transformation functions.

On the one hand, transformation functions can be determined for the transformation of the representation of input event streams by means of parameters for associated input event models. This effectively results in adaptation of the input event model functions.

In a situation where it has not been possible to record an input event stream with the aid of the event models which are available for analysis of the associated basic component, or no transformation function can be defined, the input event stream is itself transformed with the aid of a suitable transformation function. If necessary, this may be done in conjunction with the transformation function for the associated event model.

The local analysis of a basic component is then carried out using the transformed input event stream and, if necessary, using the quasi-transformed event model for the input event stream.

In order to define transformation functions, it is advantageous to also determine output event models at the output of an upstream basic component. This makes it possible to record the output event streams at the output of the respective upstream basic components in the distributed system.

The analysis method and the adaptation of the transformation functions are preferably carried out iteratively. The iteration allows the complex distributed system to be optimized. However, a suitable analysis method can also be selected step-by-step in the iteration process. The iteration process also allows feedback to previously calculated basic components in complex distributed systems with feedback, so that not only is the analysis of the basic components carried out with a steady-state input event stream, but the complex operating response of the complex distributed system is also taken into account in the analysis.

In order to define the transformation functions, time models are preferably classified for the event models, and the transformation functions are derived from the time model classes.

By way of example, the four essential event models are the periodic, the sporadic, the jitter and the burst event model. Transformation functions can be defined for each of these four time model classes.

For global analysis of the complex distributed system, the equation systems for the event models and the transformation functions of the basic components as well as the time models of the basic components are preferably combined into an overall equation system. The global analysis is then carried out using the overall equation system and at least one defined input event stream in the complex distributed system. This is the first time that a global analysis such as this has been possible, since the various types of event models which are not compatible with one another are, according to the invention, matched to one another with the aid of transformation functions.

The complex distributed system can be optimized by inserting additional components into the system in order to However, they may also be inserted permanently into the actually implemented distributed system, as circuit components for optimization. The additional components are then not only analysis aids but also elements for optimization of the complex distributed system in the design.

DESCRIPTION OF THE DRAWINGS

The invention will be explained in more detail in the following text with reference to the attached drawings, in which.

DETAILED DESCRIPTION OF THE PREFERRED EMBODIMENTS OF THE INVENTION

Figure 1:
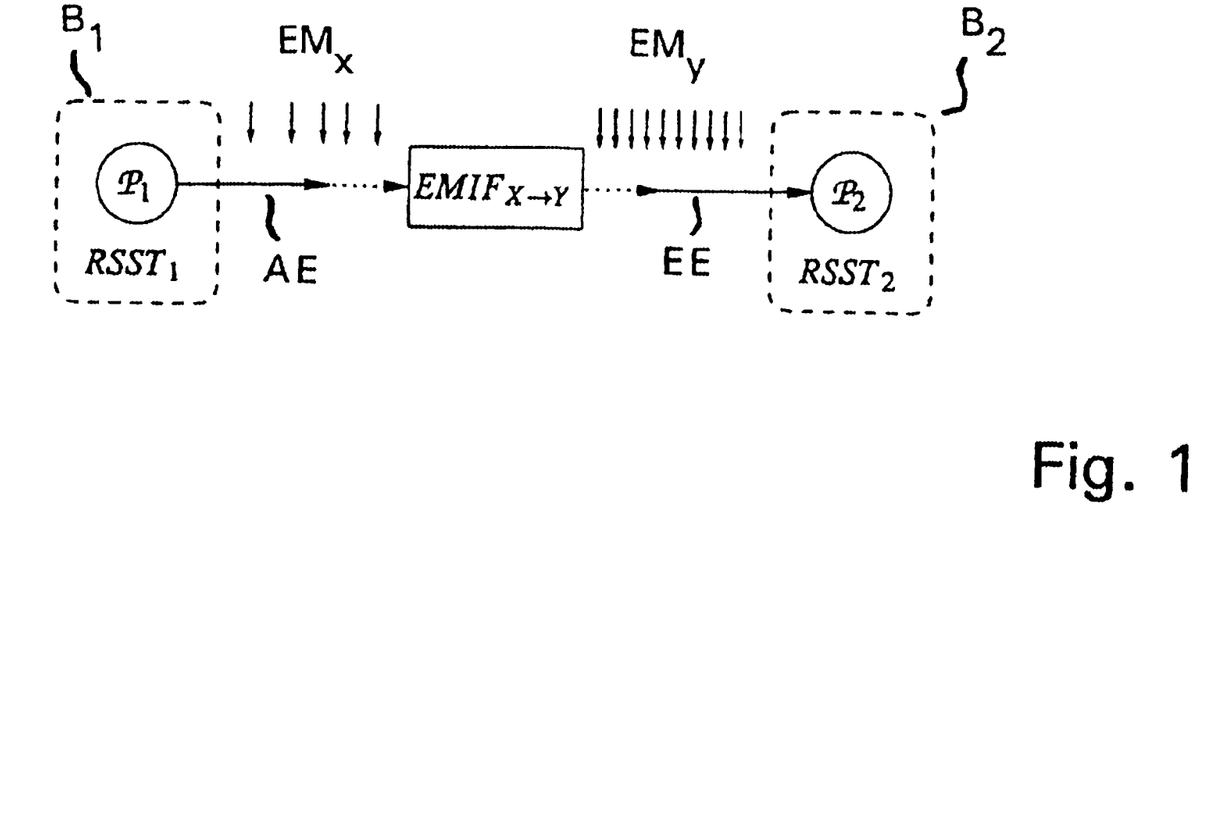
FIG. 1 shows a block diagram of two successive basic components and one transformation function for the event models.

FIG. 1 shows a block diagram with a first basic component $B_1$ and a downstream basic component $B_2$. A basic component B for the purposes of the invention includes a set of alternating processes $P_1$, $P_0$ and a sequence planning or scheduling strategy $RSST_1$ (Resource Sharing Strategy) for planning and for defining the access to jointly used resources, such as a processor or a data bus. The output event stream AE at the output of the basic component $B_1$ is defined by the process $P_1$ and the sequence strategy $RSST_1$ for the basic component $B_1$. The associated output event model $EM_x$ and the output event stream AE can be determined by known local analysis methods.

An input event model $EM_y$ for the input event stream EE at the input of the downstream basic component $B_2$ in an event model class is required for local analysis of the downstream basic component $B_2$, which event model class can be evaluated using an analysis method which is available for the downstream basic component $B_2$. It is thus necessary for the output event model $EM_x$ and the input event model $EM_y$ to be compatible with one another in order to allow local analysis of the basic components B, taking into account the relationships in the complex distributed system.

According to the invention, the input event model $EM_y$ is intended for recording the input event stream EE at the input of the basic component $B_2$. A transformation function $EMIF_{x \to y}$ is then defined for the input event model $EM_y$, in order to match the output event stream AE at the output of the preceding basic component $B_1$ to the input event model $EM_y$ of the downstream basic component $B_2$.

A local analysis of the downstream basic component $B_2$ can then be carried out with the known output event stream AE from the preceding basic component $B_1$ using the transformation function $EMIF_{x \to y}$ and the input event model $EM_y$ in a known manner.

Such transformation functions $EMIF_{x \to y}$ are generally unidirectional and may transform only events into one direction.

Figure 2:
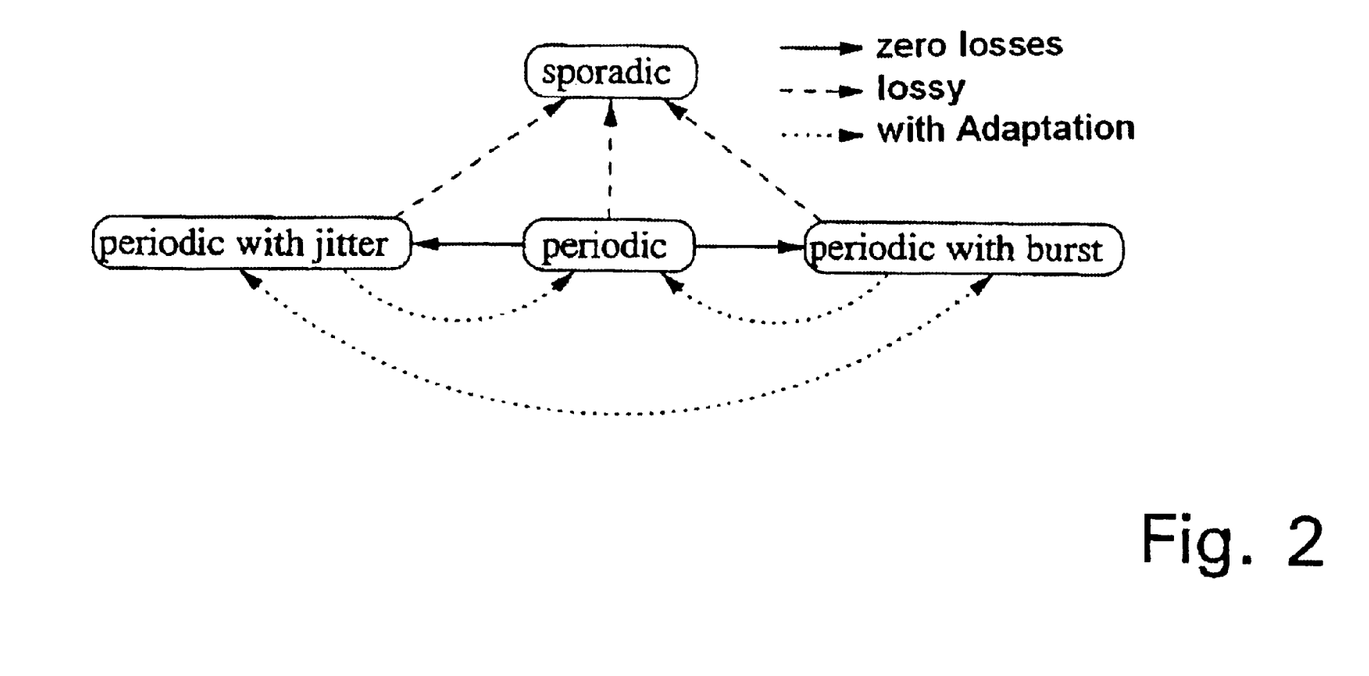
FIG. 2 shows a diagram with characteristics of the transformation between four different classes of event models.

FIG. 2 shows a diagram with possible transformations between the four major event model classes. These four major event model classes are cyclic, sporadic, jitter and burst. In a cyclic event model (periodic), events are expected at defined time intervals T. In a sporadic event model, events are expected in sporadic form, with only a minimum time interval t between two events being known. In a jitter event model, events are expected at a time interval T, although a maximum delay J of an event is permissible with respect to the fixed time interval T. In a burst event model (periodic with burst) events are activated periodically, and the activation can be grouped with a burst factor b.

Event number functions $n_{ev}(\Delta t)$ may be quoted for these four event model classes, representing a minimum or maximum number of events within a defined time interval $\Delta t$. The event number function $n_{ev}^-(\Delta t)$ in this case identifies the function for the minimum number of events, and the event number $n_{ev}^+(\Delta t)$ identifies the function for the maximum number of events.

The parameters and event number functions are shown in tabular form below:

TABLE 1

| Event model/parameter | $n_{ev}^-(\Delta t)$ | $n_{ev}^+(\Delta t)$ |
|---|---|---|
| Periodic <T> | $\left[\frac{\Delta t}{T}\right]$ | $\left[\frac{\Delta t}{T}\right]$ |
| sporadic <t> | 0 | $\left[\frac{\Delta t}{t}\right]$ |
| Jitter <T, J> | $\left[\frac{\Delta t - J}{T}\right]$ | $\left[\frac{\Delta t + J}{T}\right]$ |
| Burst <T, t, b> | $\left[\frac{\Delta t}{T}\right]b + \max\left(0, \left[\frac{\Delta t - \left(\left[\frac{\Delta t}{T}\right]+1\right)T}{t} + b\right]\right)$ | $\left[\frac{\Delta t}{T}\right]b + \min\left(b, \left[\frac{\Delta t - \left[\frac{\Delta t}{T}\right]T}{t}\right]\right)$ |

Event number functions can also be found in a similar way for other event models.

Zero-loss transformation functions can be found for the transformation from a periodic event model to a jitter event model or to a burst event model. This is shown as an arrow with a solid line in FIG. 2.

Only lossy transformation functions can be found for the transformation between a jitter event model, a periodic event model or a burst event model to a sporadic event model. This is identified by the arrow with a dashed line.

Transformation functions can be found only with an adaptation for the transformation between a jitter event model or a burst event model to a cyclic event model, or from a jitter event model to a burst event model, and vice versa.

The possible transformation functions for the described major event model classes are listed in Table 2, below.

TABLE 2

| $EMIF_{X \to Y}$ | Y = Periodic | Y = Jitter | Y = Burst | Y = sporadic |
|---|---|---|---|---|
| x = Periodic | $T_y = T_x$ (identical) | $T_y = T_x$, $J_y = 0$ | $T_y = T_x$ $b_y = 1$ $t_y = T_y$ | $t_y = T_x$ (lossy) |
| X = Jitter | | $T_y = T_x$ $J_y = J_x$ (identical) | | $t_y = T_x - J_x$ (lossy) |
| X = Burst | | | $T_y = T_x$ (identical) $b_y = b_x$ (identical) $t_y = t_x$ (identical) | $t_y = t_x$ (lossy) |
| X = sporadic | | | | $t_y = t_x$ (identical) |

A transformation function $EMIF_{x \to y}$ for event models $EM_x$ and $EM_y$ can be found for these cases, in which the event number functions satisfy the following conditions:

$$n_{evX}^+(\Delta t) \leq n_{evX}^+(\Delta t)$$

and $$n_{evX}^+(\Delta t) \geq n_{evX}^-(\Delta t)$$

The transformation functions can then also be derived by solving these equations.

Figure 3:
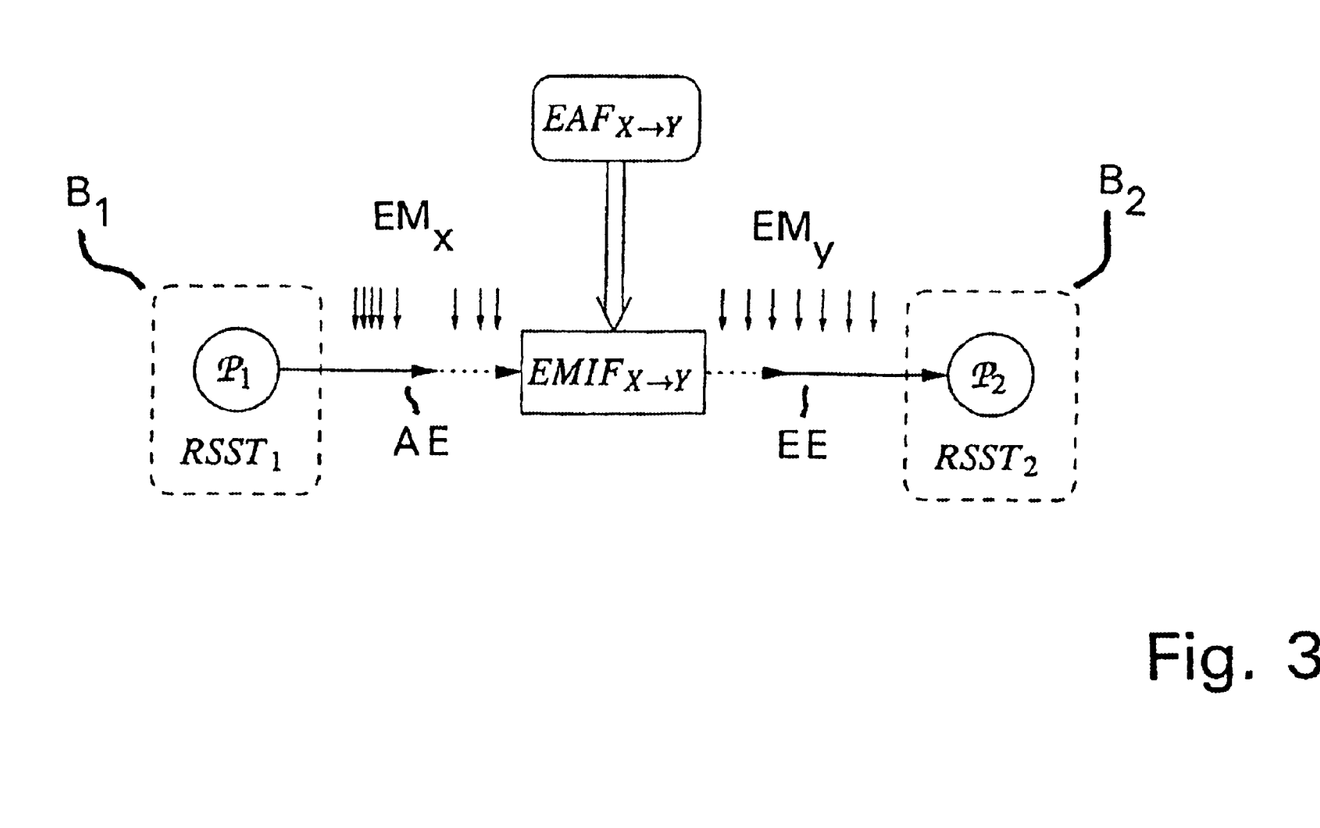
FIG. 3 shows a block diagram of two successive basic components with transformation functions for the event models and the input event streams.

For cases in which the two abovementioned conditions are not satisfied, a transformation function for transformation of the output event stream AE to a matched input event stream EE must be found alternatively or, in particular in addition, to the event model transformation function $EMIF_{x \to y}$. This additional event stream transformation function $EAF_{x \to y}$ is sketched in FIG. 3. Thus, in general, it is possible to match initially incompatible event models EM to one another. The event stream transformation functions $EAF_{x \to y}$ are generally in the form of additional components such as data buffer elements and/or timers. Possible combinations of event model transformation functions $EMIF_{x \to y}$ and event stream transformation functions $EAF_{x \to y}$ for transformation of the event models which are initially not compatible with one another are listed in Table 3, below. In this case, $d_{EAU}$ denotes the maximum data buffer delay.

TABLE 3

| X → Y | $EMIF_{X \to Y}$ | $EAF_{X \to Y}$ | $d_{EAU}^+$ |
|---|---|---|---|
| Jitter → Periodic | $T_y = T_x$ | Data buffer ($T_b = T_x$, $n_h = 1$) | $T_x$ |
| Jitter → Burst | $T_y = T_x$ $b_y = 1$ $t_y = T_y$ | Data buffer ($T_b = T_x$, $n_h = 1$) | $T_x$ |
| Burst → Periodic | $T_y = \dfrac{T_x}{b_x}$ | Data buffer $\left(T_h = \dfrac{T_x}{h_x}, n_b = h_x - \left[h_x(h_x - 1)\dfrac{t_x}{T_x}\right]\right)$ | $T_x - (b_x - 1) t_x$ |
| Burst → Jitter | $T_y = \dfrac{T_x}{b_x}, J_y = 0$ | $\left(T_h = \dfrac{T_x}{h_x}, n_b = h_x - \left[h_x(h_x - 1)\dfrac{t_x}{T_x}\right]\right)$ | $T_x - (b_x - 1) t_x$ |

The event stream transformation functions $EAF_{x \to y}$ can be derived in a known manner by analysis of the time responses of the event streams. This is illustrated by way of example with reference to FIG. 4, for a transformation between a burst event stream and a cyclic event stream.

Figure 4:
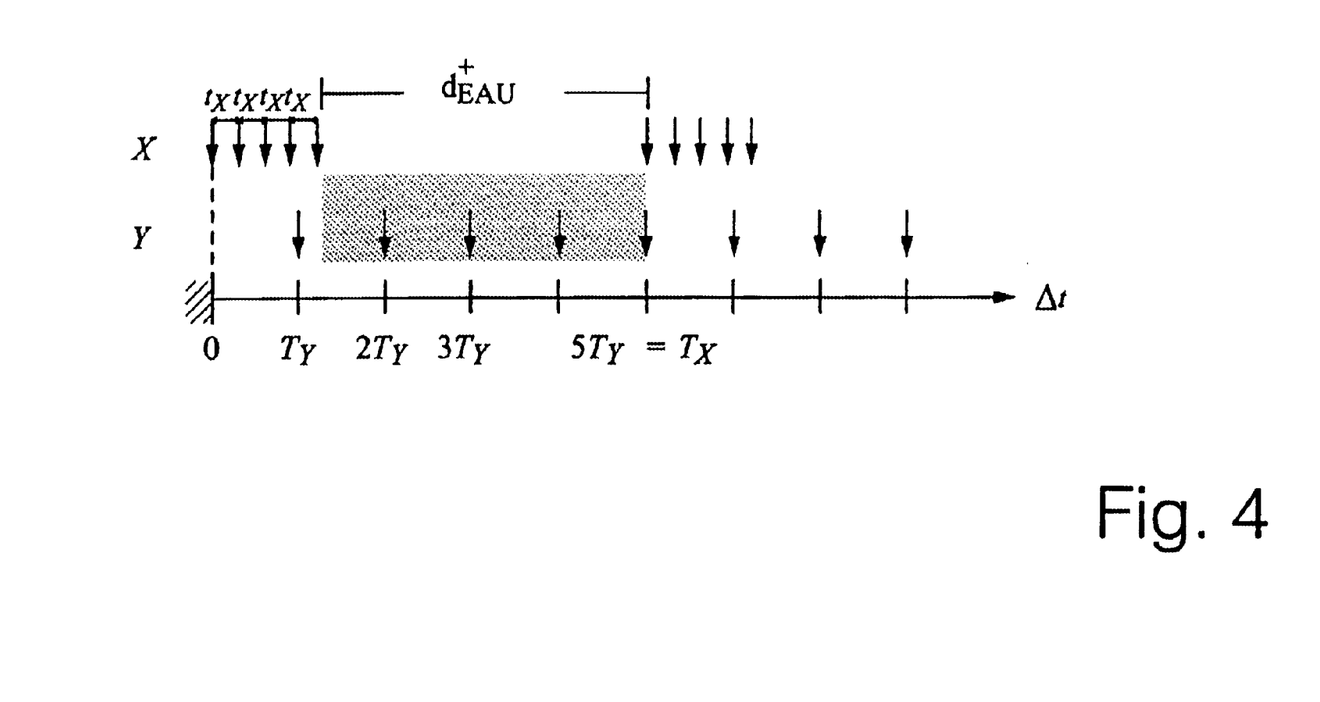
FIG. 4 shows a worst-case timing diagram of a transformation function for input event streams for transformation form a burst event model to a cyclic event mode.

It is known from the burst output event stream that $b_x$, a number of events, occurs every $T_x$ time units. This results in the average occurrence time of the events being $$\frac{T_x}{b_x},$$

which must be the period $T_y$ of the cyclic event Y in the expected input event stream. Otherwise, the data buffer would overflow or would run empty. In order to define an optimized data buffer size, it is necessary to analyze the worst-case situation. This occurs when the burst events occur as soon as possible, and the cyclic events occur with a maximum phase delay of $T_x$ with respect to the start of the burst event.

FIG. 4 shows an example for $b_x=5$, in which five successive events occur at an average interval of $T_x$ at time intervals of $T_x=5\ T_y$. This results in a maximum buffer delay between them of $d_{EAU}^+=T_x-(b_x-1)t_x$.

Since the events are loaded periodically out of the buffer, the maximum number of events in the buffer is $$n'_{EAU} = \left\lceil \frac{d_{EAU}^+}{T} \right\rceil = \left\lceil \frac{T_x - (b_x - 1)t_x}{\dfrac{T_x}{b_x}} \right\rceil - b_x \left[ b_x(b_x - 1)\dfrac{t_x}{T_x} \right]$$

The event stream transformation functions for the other cases can also be found in a similar way.

For complex distributed systems with a number of inputs, the analysis is considerably more complex. Processes can thus be carried out when an event (OR process) occurs at one of the inputs. However, a process may wait until an event occurs at all the inputs (AND process). The transformation functions may then have to be matched to the conditions of the AND or OR processes.

Figure 5:
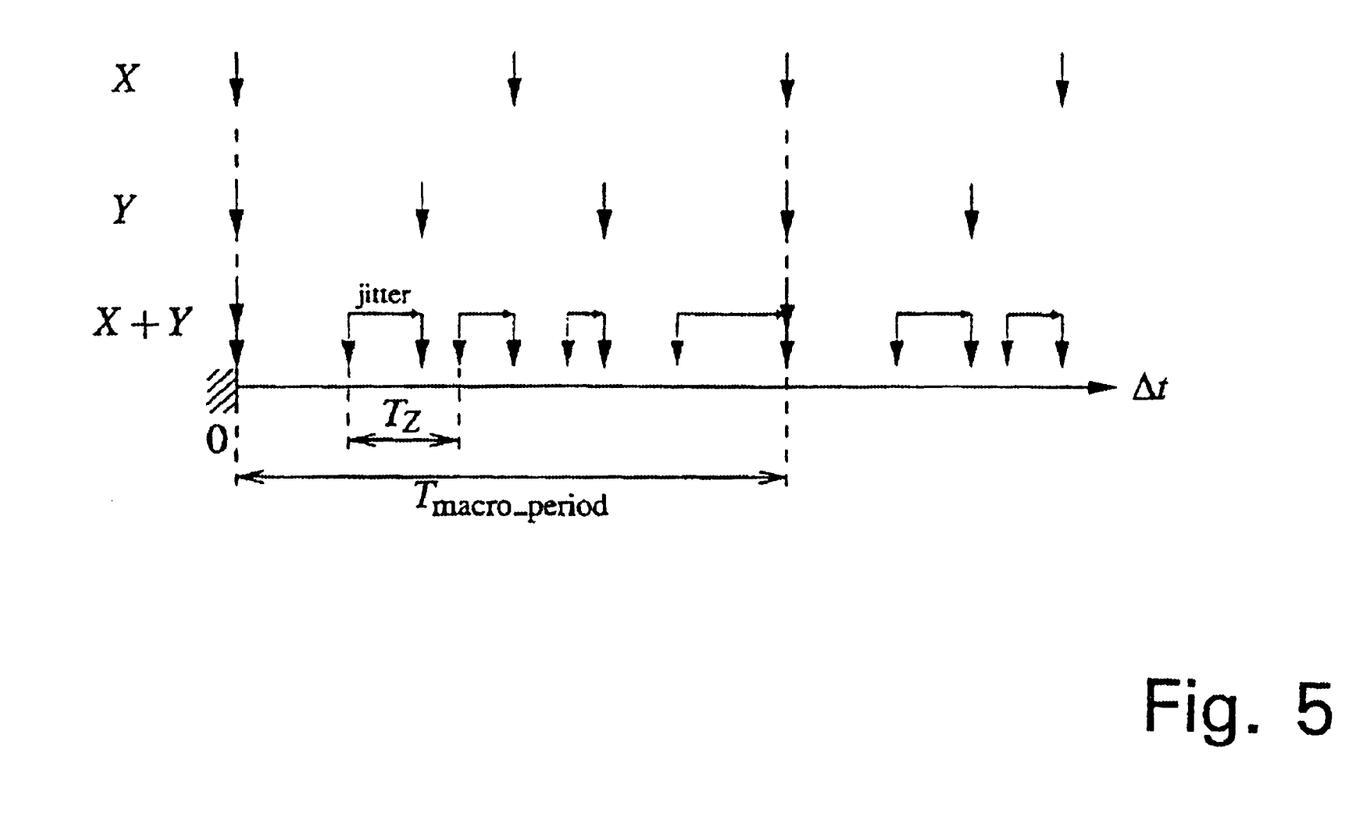
FIG. 5 shows a timing diagram of the linking of two periodic event streams.

FIG. 5 shows a timing diagram for two cyclic event streams X and Y with different periods $T_x$-1.5 $T_y$, which are linked to one another in an OR process. The result is a cyclic event stream X+Y with jitter, with the parameters $$T_x = \frac{1}{\frac{1}{T_Y} + \frac{1}{T_X}} \text{ and } J_Z = T_Z$$

for the OR processes.

The input events must coincide for AND processes. This means that the number of events $n_{ev}(\Delta t)$ in the two event streams X and Y must not diverge when $\Delta t$ is large.

$$\lim_{\Delta t \to \infty} \frac{n_{evX}(\Delta t)}{n_{evY}(\Delta t)} - 1$$

Since this condition must be satisfied for all instances of the event streams within the corresponding event models, it is necessary to ensure that the lower and upper limits of the number of events for the input stream do not themselves diverge:

$$\lim_{\Delta t \to \infty} \frac{n^-_{ev,X}(\Delta t)}{n^+_{ev,X}(\Delta t)} = 1$$

The transformation functions for AND processes can also be derived by taking account of these conditions.

Figure 6:
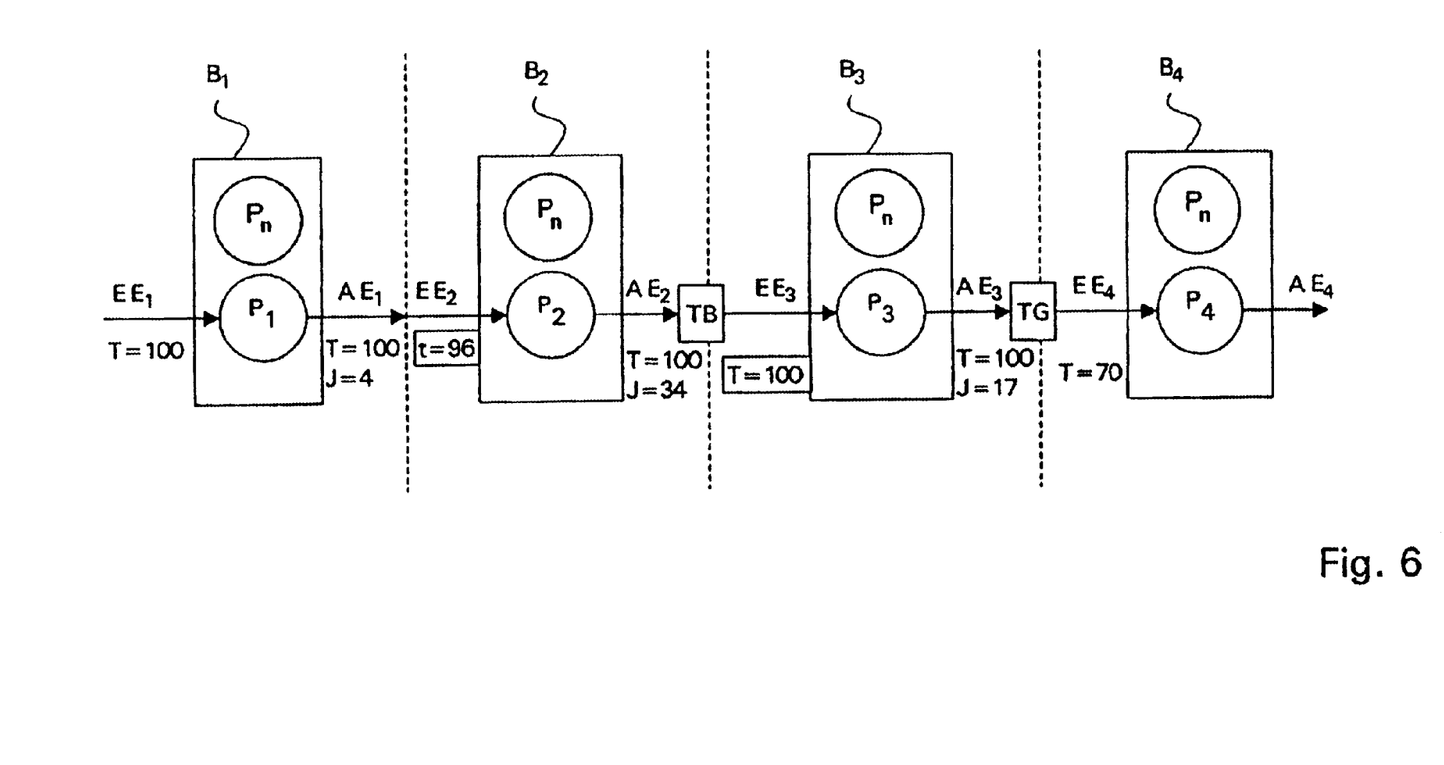
FIG. 6 shows a block diagram of a complex distributed system with additional elements for transformation for optimization of the system.

FIG. 6 shows a block diagram of a complex distributed system with an input event stream $EE_1$ into the system and with the basic components $B_1$, $B_2$, $B_3$ and $B_4$. The input event stream $EE_1$ is cyclic with a period of T=100.

The time response of the first basic component $B_1$ is now analyzed in the known manner with the aid of the input event stream $EE_1$ and the parameter T=100. The result of this analysis may be a response time interval with a lower and upper limit for the process $P_1$. Information about the output event stream $AE_1$ can be derived from the information about this response time interval and the input event stream $EE_1$. By way of example, a cyclic output event stream with jitter is assumed. The parameters are T=100 and J=4.

However, a sporadic input event stream $EE_2$ is expected at the input of the downstream basic component $B_2$. An event model transformation function $EMIF_{x \to Y}$ where $t_y = T_x - J_x$ from Table 1 as described above can be derived from this. The parameter $T_y$ for this sporadic event model is thus $t_y$=100–4=96.

It is assumed that the output event stream $AE_2$ for the local analysis of the second basic component $B_2$ is defined as a cyclic event stream with jitter with the parameters $t_x$=100 and $J_x$=34. The downstream third basic component $B_3$ is, however, expecting an exactly cyclic input event stream $EE_3$.

In addition to an event model transformation function $EMIF_{x \to y}$, an additional event stream transformation function $EAF_{x \to y}$ must therefore be found, in order to match the output event stream $AE_2$ to the input event stream $EE_1$.

The event model transformation function $EMIF_{x \to y}$ is determined, as shown in Table 2, to be $T_y = T_x$. The input stream event function $EAF_{x \to y}$ is provided by a time buffer with the parameters $T_b = T_x$ and $n_b$=1. The maximum phase delay $d_{EAU}$ is $T_x$. The time-controlled buffer $T_b$ thus has the parameters $T_b$=100 and $n_b$=1. The maximum time delay is $T_x$=100.

In this way, the output event stream $AE_2$ is itself transformed into a matched input event stream $EE_3$, and a local analysis of the third basic component $B_3$ can be carried out for a cyclic event model. The time control results in resynchronization, in which case the period of the time control thus corresponds to the mean period of the output event stream $AE_2$, which is not exactly cyclic. The size of the buffer store is thus derived from the characteristics of the output event stream $AE_2$, as has already been explained above.

For local analysis of the fourth basic component $B_4$, the cyclic output event stream $AE_3$ with jitter and with the parameters T=100 and J=17 must be matched to a cyclic input event stream $EE_4$ whose period is T=70. This requires a transformation function by means of which, for example, the sampling rate of the output event stream $AE_3$ is increased, with a timer TG being inserted as an additional component into the event stream.

For a complex distributed overall system which has been matched in such a way by means of transformation functions, the equation systems which have been found for the individual basic components B during the local analysis can now be combined in a known way to form an overall equation system, and can be solved for the overall system by means of available analysis methods, using the at least one defined input event stream $EE_1$.

The methods for process analysis and local analysis for carrying out the method according to the invention are sufficiently well known and are available, for example, as software programs.

The method is used in particular for designing complex distributed software solutions or software and hardware solutions, such as integrated circuits.

What is claimed is:

1. A method for analysis of the timing behaviour of complex distributed systems with basic components (B) which have data processing program modules and/or electronic circuit modules, having the following steps:

a) modeling of models for the data processing flow through and data communication of basic components (B) by means of abstract models;

b) determining input-event models ($EM_y$) and output-event models ($EM_x$) of basic components (B) for recording input-event streams (EE) and output-event streams (AE), said input-event models ($Em_y$) and output-event models ($EM_x$) resulting from the step of modeling;

c) classifying the input and output-events ($EM_y$, $EM_x$) at least for classification parameters period, jitter and burstiness;

d) adapting classes for the event models for one or more communicating basic components (B) by transforming the output-even ($EM_x$) into input-even models ($EM_y$) of associated directly subsequent basic components (B) by use of transformation functions ($EMIF_{x \to y}$, $EAF_{x \to y}$), said transformation functions ($EMIF_{x \to y}$, $EAF_{x \to y}$) being derived from the event model classes and provided for modeling the parameters assigned to the event model classes relative to each other;

e) adapting the event model classes for all of the basic components (B) by stepwise adapting the transformation functions ($EMIF_{x \to y}$, $EAF_{x \to y}$) of adjacent basic components; and f) determining the timing behaviour of the complex distributed system from the determined timing behaviour of the individual basic components (B) and the transformation functions by combining the equation systems for the event models ($EM_x$) and the transformation functions ($EMIF_{x \to y}$, $EAF_{x \to y}$).

2. The method as claimed in claim 1, further comprising the step of determining transformation functions ($EAF_{x \to y}$) for transformation of the event streams (EE, AE), in order to match the event streams (EE, AE) to event models ($Em_y$) of the respectively associated basic components.

3. The method as claimed in claim 1, further comprising the step of inserting additional components into the system in order to produce transformation functions ($EAF_{x \to y}$).

4. The method as claimed in claim 3, wherein additional components are data buffer elements and/or timers.

5. A computer product for analysis of the timing behaviour of complex distributed systems with program code means for carrying out the method as claimed in claim 1.

6. The method as claimed in claim 1 further comprising the step of determining the analysis method and adaptation of the transformation functions (EMIF x→y, EAF x→y) for optimization in step e) being carried out interatively.

* * * * *